Sept. 21, 1965   C. H. KNODEL, JR   3,207,882
INCLINED WELDING STATION
Filed May 13, 1963   2 Sheets-Sheet 1
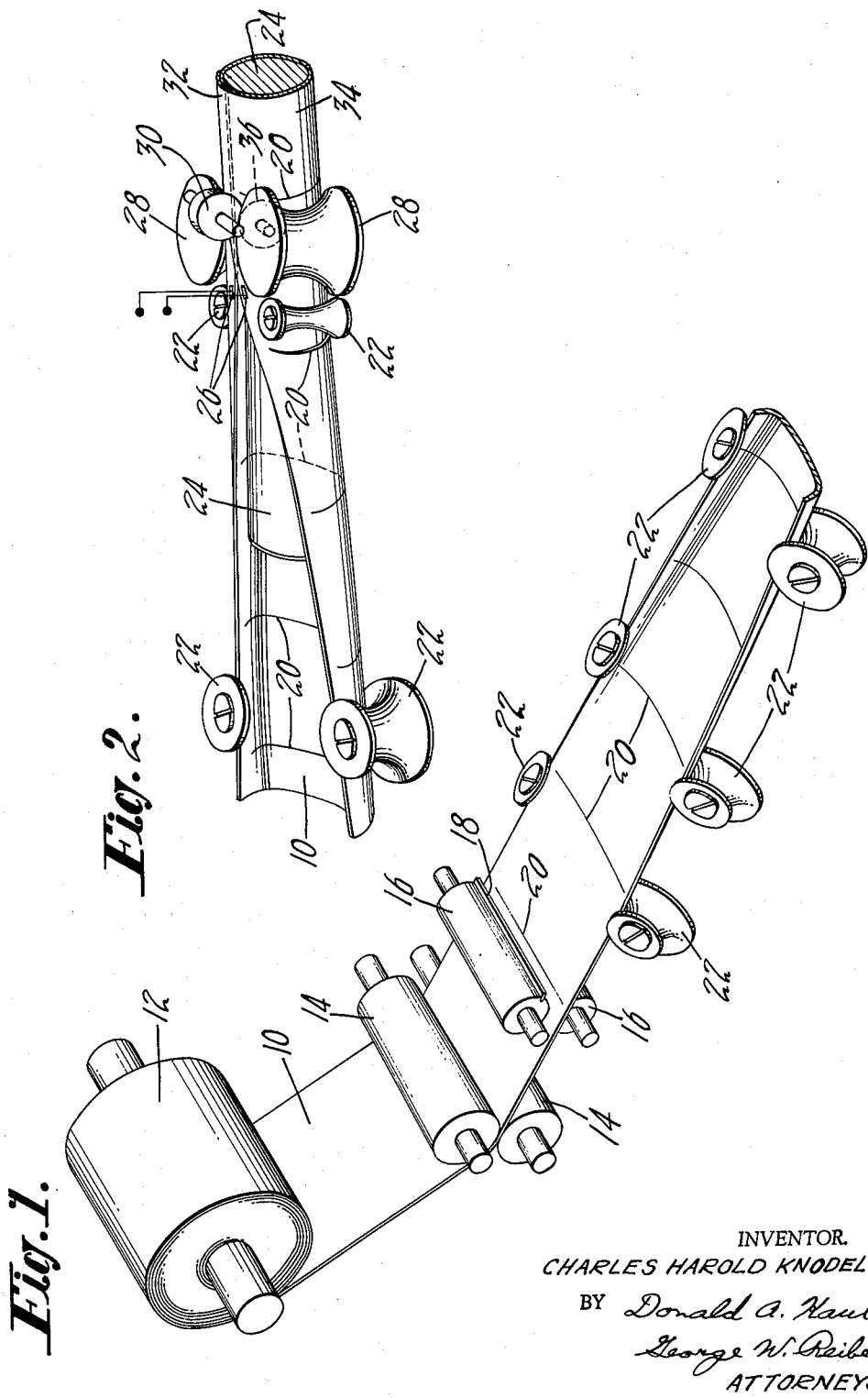
INVENTOR.
CHARLES HAROLD KNODEL JR.
BY Donald A. Haul
George W. Reiber
ATTORNEYS Sept. 21, 1965  C. H. KNODEL, JR  3,207,882
INCLINED WELDING STATION
Filed May 13, 1963  2 Sheets-Sheet 2

INVENTOR.
CHARLES HAROLD KNODEL JR.
BY Donald A. Kaul
George W. Reifer
ATTORNEYS 3,207,882
INCLINED WELDING STATION
Charles Harold Knodel, Jr., Palatine, Ill., assignor to American Can Company, New York, N.Y., a corporation of New Jersey
Filed May 13, 1963, Ser. No. 279,712
7 Claims. (Cl. 219—64)

The present invention relates to apparatus for forming sheet material of thin metal skelp in strip or coil form into tubular configuration. More particularly, it relates to an imporved welding station whereat said skelp is lap-welded into a form which can be severed into short lengths suitable for can or container bodies.

In some forms of tube mills, pre-slit or pre-scored stock having transverse lines of severance at spaced intervals therealong, is fed to a welding station whereat two or more rolls coact to forge or weld together the pre-heated longitudinal margins of the strip, thus forming the strip into a tube. Since the tube stock is introduced into the welding station in a straight in-line motion, the transverse slit edges in the pre-slit stock often crowd together into abrading contact. This causes nicking of the edges and thus creates a serious problem since, when the tube is finally formed into finished can bodies, many of such bodies must either be finished to remove the nicks and dents or must be discarded as waste since they are unable to receive end closures properly. Additionally, in the region of the welding station, the stock must travel freely for a short distance wherein the margins overlap one another prior to being welded thus providing a suitable configuration for lap-welding. If the pre-slit edges lock together, as aforementioned, a loss of control occurs in this region of free travel and the margins will not properly overlap one another.

An object, therefore, of the present invention is to overcome the aforementioned problems encountered in prior art tube forming operations.

Another object of this invention is to provide means for welding pre-slit can body stock into tubular form without creating any nicks or abrasions of the pre-slit edges.

A further object of this invention is to provide means for allowing tubular stock to travel freely, without binding of its edges, to a welding station whereat the tube is lap-welded.

Still another object of this invention is to provide an improved welding station which can be readily adapted for use in already existing tube mills without requiring extensive reconstruction.

Numerous other objects and advantages of the invention will be apparent as it is better understood from the following description, which, taken in connection with the accompanying drawings, discloses a preferred embodiment thereof.

The foregoing objects are obtained by providing a welding station which is inclined at a slight angle to the axis of the incoming strip material. This inclination is effected by forming the inner horn or welding cylinder with a small angle therein. Thus, as the incoming pre-slit material reaches the angle on the welding cylinder, the pre-slit edges open a slight angle thus preventing binding and/or abrading. This opening of the slits also prevents that portion of the tube stock in the region of the welding station from locking its longitudinal margins together in such a manner as to prevent the free travel necessary if these margins of the tube are to successfully overlap one another in a manner as is required for lap-welding. Additionally, the distance from the center line of the welding station to the angle on the welding cylinder is of a dimension less than the distance between the pre-slit edges on the tube stock, which defines the length of a can body, thus assuring that the slits will properly open just as they are about to enter the welding station.

Referring to the drawings:

FIGS. 1 and 2 are continuing perspective views of one form of apparatus satisfactory for carrying out the steps of transversely slitting flat strip stock as it comes off a coil and for forming this slit stock into a lap-welded continuous tube;

Figure 3:
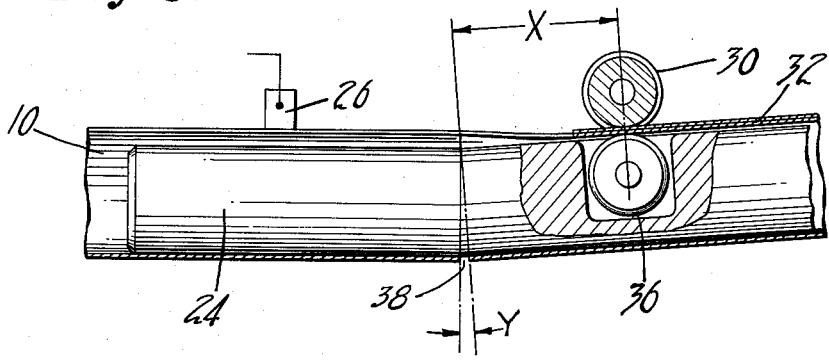
FIG. 3 is a view partly in section of the welding cylinder or inside horn used at the welding station of the present apparatus.

While it should be understood that the tube-forming apparatus per se forms no part of the present invention, it is felt that an understanding of this apparatus will be helpful in understanding the significance of the present invention. However, it is to be understood that the present invention relates merely to an improved welding station within a tube mill, and not to the entire mill itself.

Briefly described, skelp or a strip 10 of sheet metal, suitable for use in the manufacture of can bodies, is supplied from a coil 12 of the material. The strip 10 is of a width equal to the circumference of the can bodies to be produced and of a length sufficient to provide a considerable number of can bodies. The unwinding of the strip 10 from the coil 12 and its feeding for subsequent operations is performed by a pair of feed rollers 14 which frictionally engage the upper and lower surfaces of the strip disposed between the rollers. After passing between the feed rollers 14, the strip 10 passes between a pair of opposed rollers 16, the upper one of which carries one or more transversely extending knife 18 and the lower one of which carries cooperating recess (not shown) for the purpose of slitting the strip 10 transversely along a portion of its width. The rotation of the knife 18 as the strip 10 passes between the rollers 16 produces a series of slits 20 at spaced intervals along the length of the strip in accordance with the length of the can bodies to be produced. As can be seen, the slits 20 extend across the central portion of the strip 10 but terminate just short of the marginal or side edges of the strip.

The partially slit strip 10 then passes between a series of forming rollers 22 which gradually convert the strip progressively from a flat form to a tubular form. As can be seen from FIG. 2, when the strip 10 reaches the region of the welding station, it is gradually formed around a mandrel 24, which is also referred herein as an inner horn or a welding cylinder. The edges of the strip 10 are heated by welding electrodes 26 and a final set of forming rollers 28 causes these heated edges to overlap and pass under a forging or welding roll 30 which creates a lap weld 32 and thus forms the strip 10 into a cylinder 34.

Referring now to FIG. 3, the mandrel or welding cylinder 24 is shown in greater detail. An inner forging roll 36 is rotatably mounted in a cavity within the welding cylinder 24 and is juxtaposed in slightly spaced relationship to the outer forging roll 30. In operation, the overlapped margins of the strip 10 are heated by high frequency current supplied by the electrodes 26 and are passed between the inner and outer forging rolls 30 and 36, respectively, which coact to create the lap weld 32. The inner forging roll 36 extends only a few thousandths of an inch above the outer diameter of the welding cylinder 24 and it is thus seen that the strip 10 can be wrapped around the welding cylinder 24 without undue interference from the inner forging roll 36. The welding cylinder is angled at a point 38 which is located at a distance X from the common center line of the forging rolls 30 and 36. The magnitude of the angle of inclination at the point 38 is represented by Y. The distance X must be no greater than the length of one can body, which is defined by the distance between the slits 20, to assure that the slits will properly open at the point 38 and thus to be fed into the welding station between the rolls 30 and 36 with an angle Y between the slit edges. If the distance X is greater than the length of one can body, the slit will close again before the can body is welded between the forging rolls and consequently the undesirable nicking of the slit edges will still occur. The maximum magnitude of the angle Y is approximately 4° and any value greater than this will result in a kinking action on the unslit portion of the strip 10. While there is no minimum value for the angle Y, as a practical matter it is undesirable to have it less than 1°, since an angle smaller than this would not prove satisfactory for the high speeds involved in apparatus of this type.

Figure 4:
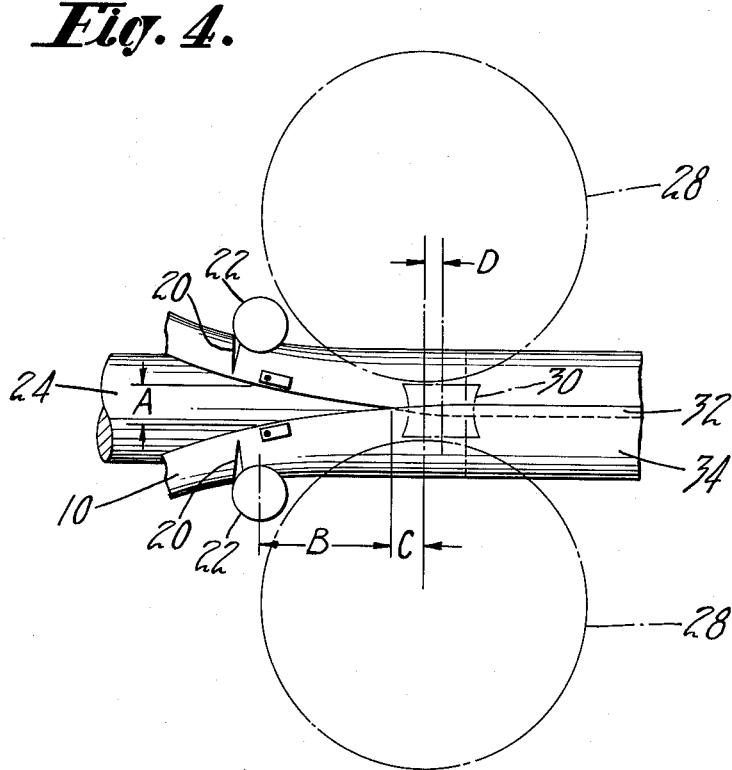
FIG. 4 is an enlarged plan view of the welding station.

As shown in FIG. 4, when the stock 10 reaches the vicinity of the welding station, it is separated by a distance A in the region of the electrodes 26. From this point, the stock must travel freely until it is formed into a cylindrical or tubular form at a point corresponding to the center line of the final forming rollers 28. In this region of free travel, the stock 10 travels through a zone B until the edges of the strip 10 meet at an apex. From this apex, the stock travels through an other zone C wherein the overlap occurs. In this entire region of free travel, as defined by the distance of zone B plus C, it is imperative that the edges of the stock move freely. If the preslit edges 20 bind or lock together, such free travel cannot occur and consequently the marginal edges of the strip 10 will not be properly overlapped for welding by the forging rolls 30 and 36. The provision of the angle Y on the welding cylinder 24 assures that such locking will not occur and thus also assures that the stock will travel freely into an overlapped position. Since the tube or can bodies are wrapped around the welding cylinder 24, the diameter of that cylinder, in conjunction with the curvature of the final forming rollers 28, determines the amount of overlap to be welded. This final diameter is determined at the center line of the forming rollers 28. From this point the tube moves through a very short distance D to the center line of the welding station, which is defined by the forging rolls 30 and 36. Since the edges of the strip 10 have been heated by high frequency current from the electrodes 26 the forging rolls 30 and 36 coact to weld the heated edges, which are presented in overlapping relationship, into a lap weld 32.

As an exemplary, but by no means limiting, form of the apparatus, satisfactory results were obtained using dimensions of X equal 4.5″, Y equal 1°, A equal 0.075″, and D equal ⅛″ or less. Across the zone B, the edges move relative to one another a distance of 0.075″ and across the zone C, the edges overlap one another to a distance of 0.050″ or less. This set-up allowed the strip 10 to travel through 0.125″ of free travel without any loss of control due to locking of the edges of the slit 20. After the strip 10 is welded into a tube 34 at the welding station, suitable severing means such as shown in U.S. Patent No. 2,984,138, can cut through the unslit portion and separate the tube 34 into individual cylindrical can bodies.

It is thought that the invention and many of its attendant features will be understood from the foregoing description, and it will be apparent that various changes may be made in the form, construction and arrangement of parts, without departing from the spirit and scope of the invention or sacrificing all of its material advantages, the form hereinbefore described being merely a preferred embodiment thereof.

I claim:
1. In a tubing mill for manufacturing can body tubing from metal coil strip, the strip being of a width substantially that of the desired peripheral dimension of can bodies to be formed therefrom and being laterally preslit except for its outer longitudinal margins in body-length increments, welding station means for lap welding said outer longitudinal margins to form said strip into said tubing, said welding station means comprising: a welding cylinder having a forging roller rotatably mounted therein adjacent one end thereof; a coacting forging roller in closely spaced juxtaposition to said welding cylinder forging roll; means for feeding said strip linearly to said welding station; at least two forming members surrounding said welding cylinder for tubularly forming said incoming strip about said welding cylinder with its longitudinal margins overlapped and interposed between said forging rolls; and high-frequency electrode means for heating said margins prior to their passage between said forging rolls; said welding cylinder being formed with a slight angle therein and thus defining a straight portion over which said incoming strip material first passes and an inclined portion containing the forging roll over which said strip material subsequently passes to effect a lap weld of said margins between said forging rolls, the distance between said angle and said forging roll being less than the distance between the slits in said strip, said angle on said welding cylinder causing the slits in said strip to open as they pass thereover and thus preventing nicking and binding the edges of said slits.

2. Welding station means as defined in claim 1 wherein the angle of said welding cylinder is 4° or less.

3. Apparatus for forming a strip having imperforate margins and a plurality of spaced slits extending between said margins into a tube with said margins being welded in overlapping relationship, said apparatus comprising: an angulated mandrel having separate portions defining an axial portion and an inclined portion; said inclined portion having an axis displaced by an angle from the axis of said axial portion; feeding means for introducing said strip axially along the outside of said axial portion; forming means surrounding said mandrel to form said strip into a tube around said mandrel with said margins of said strip being in overlapped relationship; said angulated mandrel also causing said strip to alter direction and move from a direction along said axial portion to a direction along said inclined portion, this alteration in direction occurring at the angle in said mandrel and thus causing each slit in the strip, when it reaches the angle, to open to a position whereat its edges are separated by an amount substantially equal to said angle; and welding means at some point along said inclined portion for creating a weld between said overlapped outer margins while said slit edges remain separated.

4. Apparatus as defined in claim 3 wherein said angle is 4° or less.

5. Apparatus as defined in claim 3 wherein said welding means includes a pair of aligned coacting rollers.

6. Apparatus as defined in claim 5 wherein said rollers are aligned along said inclined portion at a distance from said angle which is less than the distance between the slits in said strip.

7. Apparatus as defined in claim 6 wherein one of said rollers is rotatably mounted within said inclined portion and the other of said rollers is in spaced juxtaposition thereover.

References Cited by the Examiner

UNITED STATES PATENTS

| | | | |
|---|---|---|---|
| 2,187,740 | 1/40 | Hothersall | 219—64 |
| 2,444,463 | 7/48 | Nordquist | 219—64 X |

RICHARD M. WOOD, *Primary Examiner.*

JOSEPH V. TRUHE, *Examiner.*